May 19, 1964 S. P. WORDEN 3,133,459

APPARATUS FOR ATTACHING LEADS TO CONTACTS

Filed Nov. 8, 1960

INVENTOR

Samuel P. Worden

BY

Stevens, Davis, Miller & Mosher

ATTORNEYS 3,133,459
Patented May 19, 1964

3,133,459
APPARATUS FOR ATTACHING LEADS TO CONTACTS

Samuel P. Worden, Houston, Tex., assignor to Texas Instruments Incorporated, Dallas, Tex., a corporation of Delaware Filed Nov. 8, 1960, Ser. No. 68,108
9 Claims. (Cl. 78—82)

The present invention relates to a method and apparatus for attaching elements to a semiconductor device and more particularly, to a method and apparatus for attaching leads to closely spaced contacts on a transistor.

In the fabrication of semiconductor devices, and more particularly, transistor devices, two contacts are frequently placed in an adjacent relationship on a common surface of the device. This is especially true as regards attaching the base and emitter contacts to transistor devices of the alloy-junction and diffused-junction types. Transistor devices have, since their inception, been quite small structures characterized by dimensions of the order of small fractions of an inch, and from this it naturally follows that the transistor contacts are even substantially smaller, usually measured in terms of thousandths of an inch. It can be appreciated from these size considerations that the arrangement of the contacts on the transistor and the attachment of leads to the contacts is most delicate and must be carefully contrived if successful devices are to result.

As a typical example, transistor devices of the diffused-junction type are presently being manufactured having very small base and emitter contacts attached, for example, by alloying to a common surface approximately one-thousandth (0.001) of an inch apart. The size and spacing of the contacts in these particular devices is dictated by the desired high frequency response of the finished devices. To these contacts, themselves only a few thousandths of an inch in diameter, are attached leads in the form of wires of quite small diameter, such as six ten-thousandths (0.0006) of an inch. To more fully comprehend the type of structure under consideration, attention is dircted to the fact that the leads are often separated at their points of attachment to their respective contacts by a distance less than the diameter of a human hair. Since the contacts are not distinguishable by the naked eye, attachment of the leads is deliberately and carefully accomplished one lead at a time, by hand, and with the aid of a powerful microscope to enable visual observation and control.

The above-described manner of attaching leads to transistor contacts is tedious, time-consuming, and costly. Despite a desire to improve the manner of attaching leads to render this phase of transistor fabrication more efficient, there has been little progress through the years. The principal difficulties stem from the inordinately small sizes and dimensions of the contacts, leads, and the spacing between contacts, and from the delicacy with which these parts must be handled and processed.

The present invention provides a solution for the problems inherent in attaching small wires to closely spaced contacts on transistor devices to effect precision attachments. In a preferred form of the present invention, leads are compression bonded to the base and emitter contacts of a transistor configuration of the diffused-junction type, simultaneously, with no danger of the leads being confused or bonded to the wrong contacts. This is accomplished by means of a specially designed tool adapted to engage spaced portions of a wire with a pair of spaced contacts. By selecting optimum pressures and temperatures, bonding of the separate portions of the wire to their respective contacts is accomplished at substantially the same time. The tool is also provided with a knife blade which is moved into position to sever the wire between the spaced portions while the pressure is maintained on the contacts to provide two separate leads, each connected to their respective contacts.

Accordingly, it is a principal object of the present invention to provide a novel method and apparatus for attaching at least two leads to their respective contacts in proper spaced relation.

It is a further object of the present invention to provide a method and apparatus for compression bonding a single wire to a pair of spaced contacts of a transistor device and severing the wire between the contacts to provide two separate leads connected to their respective contacts.

It is a still further object of the present invention to provide a method and apparatus for attaching leads simultaneously to both the base and emitter contacts of a transistor device more expediently and economically than has heretofore been possible by following prior art techniques.

Further objects and advantages of the present invention will become readily apparent as the following detailed description of the invention unfolds and when taken in conjunction with the drawings wherein.

Figure 1:
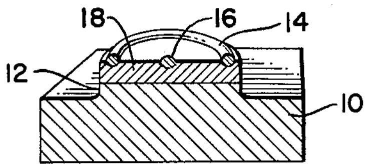
FIGURE 1 is a sectional view of a semiconductor device before the leads have been attached thereto in accordance with the present invention.

Referring to FIGURE 1, there is shown a semiconductor block 10 having an upwardly projecting boss 12 with a contact ring 14 on the upper periphery thereof and a dot contact 16 disposed within the ring 14. The compositions of the semiconductor block 10, and contacts 14 and 16 are unimportant insofar as the present invention is concerned. However, in order to aid in understanding the invention, a brief description of an exemplary semiconductor will be given. The semiconductor block 10 may, if desired, be of any semiconductor material containing an active impurity, that is, an impurity affecting the conductivity type of the semiconductor material. Thus, the block 10 may be silicon, germanium, or other material, containing either n-type conductivity-producing or p-type conductivity-producing impurities. An active impurity of the type opposite to that present in block 10 is diffused into the upper surface of the boss 12 in order to define a p-n junction 18. A base and emitter contact are located on the upper surface of the boss 12 and, for the purposes of the present invention, it will be assumed that the ring 14 is a base contact made to the base region of a semiconductor body, that is, the area of the slice above the junction 18, and that the dot contact 16 constitutes an alloyed emitter contact.

In the semiconductor configuration of FIGURE 1, the contacts are so small that the base and emitter contacts are not distinguishable by the naked eye. In order to truly appreciate the sizes involved, typical dimensions of the contacts and their spacing are given. The inner diameter and outer diameter of the ring 14 may be five-thousandths (0.005) of an inch and ten-thousandths (0.010) of an inch respectively. The diameter of the dot may be twenty-five ten-thousandths (0.0025) of an inch. The dot contact 16 and ring 14 are concentrically arranged, and thus the dot contact is separated from the inner edge of the ring by about twenty-five ten-thousandths (0.0025) of an inch.

Figures 2, 3:
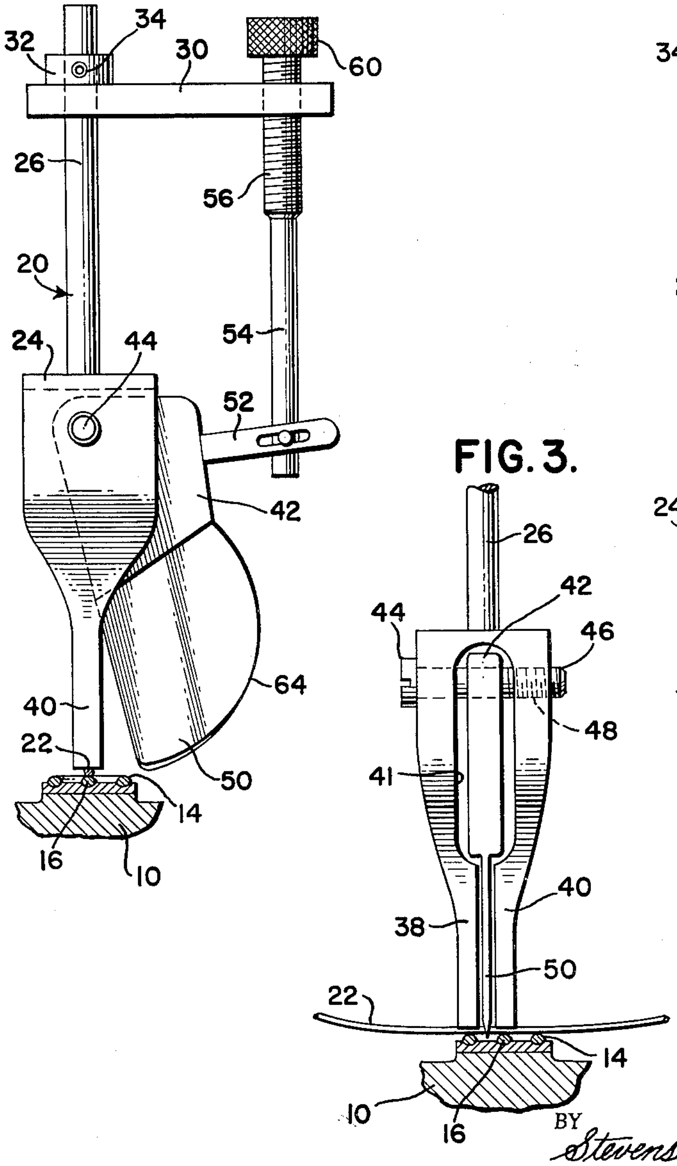
FIGURE 2 is a side elevational view of apparatus illustrating one embodiment of the present invention.
FIGURE 3 is a front elevational view of the apparatus illustrated in FIGURE 1.

Referring to FIGURES 2 and 3, an apparatus 20 illustrating one embodiment of the invention is disclosed in position to compression bond a wire 22 to the contacts 14 and 16 of the semiconductor body 10. The apparatus 20 comprises a unique tool 24 having a rod 26 extending upwardly therefrom and slidably fitted within an aperture in a suitable supporting jig 30. A stop collar 32, or the like, is adjustably affixed to the upper end of the rod 26, such as by an Allen screw 34 for example, to limit the downward movement of the rod 26 relative to the supporting jig 30. The supporting jig 30 can be vertically raised and lowered by any suitable means, thereby raising and lowering the tool 24. In order to make the discussion as concise as possible, the related apparatus for raising and lowering the jig 30 has not been shown. Those skilled in the art could readily provide such related apparatus and a description of the related apparatus is not necessary to understand the present invention.

The tool 24 comprises two chisel blades 38 and 40 which are spaced apart at their lower ends at a distance equal to the spacing between the dot contact 16 and ring 14. The upper portions of the chisel blades 38 and 40 are enlarged to provide added strength and portions thereof are more widely spaced to provide a recess 41 for receiving the enlarged upper end of a cutting knife 42 which is pivotally mounted between the chisel blades in any suitable manner, such as by a bolt 44 having a threaded end 46 screwed into an internally threaded aperture 48 in the upper end of the chisel blade 40. A very thin cutting blade 50 extends downwardly from the enlarged upper end of the cutting knife 42 and between the lower ends of the chisel blades 38 and 40. An arm 52 projects rearwardly from the upper end of the cutting knife 42, and is pivotally connected to the lower end of a rod 54 by a suitable pin and slot connection to enable the arm 52 to pivot the cutting blade in response to vertical movement of the rod 54. The upper end of the rod 54 has an enlarged externally threaded portion 56 which threadedly engages an internally threaded aperture in the supporting jig 30, and a knurled knob 60 is provided on the upper end of the threaded portion 56 for rotating the rod 54. Rotation of the rod 54 will advance or retract the rod vertically relative to the supporting jig 30 to vary the position of the cutting knife 42 from that illustrated in FIGURE 2.

In operation, the apparatus 20 is indexed over the semiconductor body 10, which can be supported on a suitable table, for example, and the supporting jig 30 is advanced downwardly to the position illustrated in FIGURES 2 and 3 wherein the chisel blades 40 clamp the wire 22 against the dot contact 16 and a portion of the ring 14. Further advancement of the supporting jig 30 will cause the supporting jig 30 to leave the collar 32 so that the entire weight of the tool 24 and rod 26 rests on the wire 22 to force it against the contacts. Sufficient heat is then applied to compression bond the wire 22 to the contacts 14 and 16. With this construction, the pressure applied can be carefully controlled, and if additional pressure is desired, suitable weights can be added to the rod 26 or the tool 24.

Figure 4:
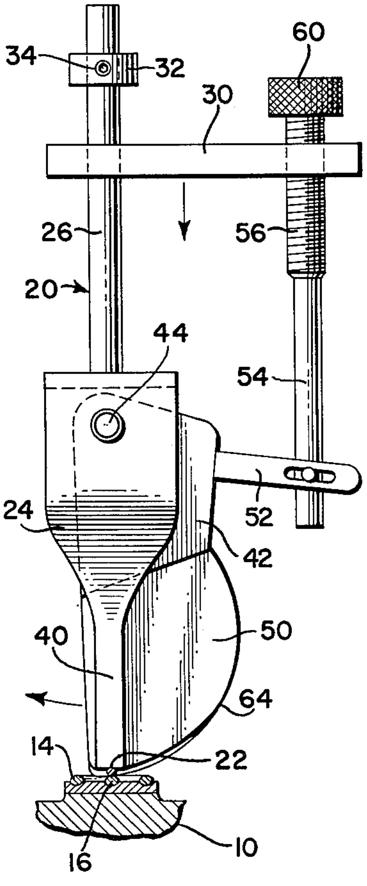
FIGURE 4 is a view similar to that of FIGURE 1 illustrating the apparatus after the cutting blade has been moved to its cutting position.

When the supporting jig 30 is advanced downwardly a sufficient distance to leave the collar 32, the tool 24 will stop as previously described. Further advancement of the supporting jig 30 will move the rod 54 downwardly to pivot the cutting blade 50 from the position illustrated in FIGURE 2 toward the position illustrated in FIGURE 4 to cut the wire 22 between the contacts 14 and 16. Thus, the wire is cut to provide two separate leads connected to their respective contacts while the chisel blades 38 and 40 maintain the same pressure on the contacts. After the wire has been cut in this manner, the supporting jig 30 is moved upwardly to pivot the cutting blade back to the position illustrated in FIGURE 2. At this point, the supporting jig will engage the collar 32 so that continued upward movement thereof will lift the tool 24 from the semiconductor 10.

From the foregoing, it can be seen that the apparatus 20 provides a very positive, rapid and effective way of accurately connecting separate leads to the contacts 14 and 16. The stop collar 32 and knurled knob 60 on the upper end of the rod 54 provide simple adjustments for accurately controlling the point at which the chisel blades 38 and 40 contact the wire 22, and the initial position of the cutting blade 50 before it starts to pivot. The supporting jig 30 can be moved downwardly and upwardly in one continuous movement, if desired, to complete the entire operation. Further, the exact point at which the downward movement of the supporting jig 30 stops is not critical, since additional movement beyond this point merely pivots the cutting blade 50 through a greater angle and does not increase the pressure which the tool 24 exerts against the contacts. This provides a valuable built-in override feature.

The trailing edge 64 of the cutting blade is curved to make certain that it clears the ring 14, and is feathered so that it widens out slightly. With this feathered construction, the knife blade will separate the leads apart after they have been cut to insure that they do not accidentally contact one another after they have been cut.

Many modifications may be made to the above-described preferred embodiment of the invention without departing from the spirit and scope of the invention, which is limited only as defined in the appended claims.

What is claimed is:

1. A tool for attaching separate leads to a pair of closely spaced contacts on a semiconductor body comprising spaced-apart chisel blades, means including said chisel blades adapted to force spaced portions of a wire into engagement with the contacts to provide bonding of the wire to the contacts, and a cutting blade movably mounted between said chisel blades in position to cut the wire between the spaced portions.

2. A tool for attaching separate leads to a pair of closely spaced contacts on a semiconductor body comprising spaced-apart chisel blades, means including said chisel blades adapted to force spaced portions of a wire into engagement with the contacts to provide bonding of the wire to the contacts, and a cutting blade pivotally mounted on said chisel blade and swingable therebetween to cut the wire between the spaced portions.

3. A tool for attaching separate leads to a pair of closely spaced contacts on a semiconductor body comprising spaced-apart chisel blades having the lower ends thereof adapted to force spaced portions of a wire into engagement with the contacts to provide bonding of the wire to the contacts, the upper ends of said chisel blades being enlarged to add rigidity thereto and defining an enlarged recess therebetween, a cutting knife having an enlarged upper end disposed within said recess and pivotally mounted between said chisel blades, said cutting knife having a very thin cutting blade extending downwardly from said enlarged upper end and swingable between the chisel blades to cut the wire between said spaced portions.

4. The invention as defined in claim 3 wherein said cutting blade is feathered from the cutting edge thereof to provide a slightly greater thickness to separate the two leads from one another after the wire has been cut.

5. Apparatus for attaching separate leads to a pair of closely spaced contacts on the surface of a semiconductor body comprising a tool having a pair of spaced-apart chisel blades with a cutting blade movably mounted between said chisel blades, means for advancing said chisel blades into engagement with spaced portions of a wire and force them into engagement with the contacts to provide bonding of the wire to the contacts, and means for moving said cutting blade between said chisel blades to cut the wire between the spaced portions.

6. Apparatus for attaching separate leads to a pair of closely spaced contacts on the surface of a semiconductor body comprising a tool having a pair of spaced-apart chisel blades with a cutting blade movably mounted between said chisel blades, means for advancing said chisel blades into engagement with spaced portions of a wire and force them into engagement with the contacts to provide bonding of the wire to the contacts, said means including override means to limit the force which the chisel blades exert on the contacts, and means for moving said cutting blade between said chisel blades to cut the wire between said spaced portions.

7. Apparatus for attaching separate leads to a pair of closely-spaced contacts on the surface of a semiconductor body comprising a tool having a pair of spaced-apart chisel blades with a cutting blade movably mounted between said chisel blades, means for advancing said chisel blades into engagement with spaced portions of a wire and force them into engagement with the contacts, override means for limiting the force which said chisel blades exert on the contacts, and means responsive to said override means for moving said cutting blade between said chisel blades to cut the wire between the spaced portions.

8. Apparatus for attaching separate leads to a pair of closely-spaced contacts on the surface of a semiconductor body comprising a tool having a pair of spaced-apart chisel blades with a cutting blade pivotally mounted between said chisel blades, a supporting jig movable downwardly and upwardly, means for slidably mounting said tool on said supporting jig for vertical movement relative thereto, stop means for limiting the downward movement of said tool relative to said supporting jig, and means on said supporting jig engaging said cutting blade to pivot the cutting blade between said chisel blades to cut the wire between the spaced portions in response to relative movement between said tool and supporting jig.

9. The invention as defined in claim 8 wherein said last-mentioned means comprises a rod extending downwardly from said supporting jig and adjustably connected thereto for vertical positioning relative thereto, an arm extending rearwardly from said cutting blade, and means for connecting said rod to said arm to pivot the arm in response to vertical movement of the rod.

References Cited in the file of this patent

UNITED STATES PATENTS

| | | |
|---|---|---|
| 811,940 | Marston | Feb. 6, 1906 |
| 2,385,386 | Stoffel | Sept. 25, 1945 |
| 2,713,713 | Tuffs | July 26, 1955 |
| 3,087,239 | Clagett | Apr. 30, 1963 |

FOREIGN PATENTS

| | | |
|---|---|---|
| 103,344 | Australia | Mar. 10, 1938 |

OTHER REFERENCES

Bell Laboratories Record, vol. 36, April 1958, pp. 127-130.